United States Patent
Kondo

(10) Patent No.: US 6,833,971 B2
(45) Date of Patent: Dec. 21, 2004

(54) DIGITAL VFO DEVICE

(75) Inventor: Tomokazu Kondo, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 404 days.

(21) Appl. No.: 10/116,934

(22) Filed: Apr. 5, 2002

(65) Prior Publication Data
US 2003/0189779 A1 Oct. 9, 2003

(30) Foreign Application Priority Data

Apr. 6, 2001 (JP) ........................................ 2001-108982

(51) Int. Cl.$^7$ .............................................. G11B 5/09
(52) U.S. Cl. .......................................... 360/51; 360/46
(58) Field of Search ............................. 360/51, 53, 46; 331/48, 179

(56) References Cited

U.S. PATENT DOCUMENTS 4,567,448 A * 1/1986 Ikeda ........................... 331/25
6,014,277 A * 1/2000 Christensen et al. ......... 360/53

FOREIGN PATENT DOCUMENTS

JP 03-227123 10/1991

* cited by examiner

Primary Examiner—David Hudspeth
Assistant Examiner—Varsha A. Kapadia
(74) Attorney, Agent, or Firm—Katten Muchin Zavis Rosenman

(57) ABSTRACT

Disclosed is a digital VFO device which comprises a plurality of VFO circuits 12 and 14; synchronous counters 12a and 14a installed in each VFO circuits 12 and 14; and an adjusting circuit 110 selecting one of the VFO circuits 12 and 14 based on signals 113 and 114 representing the peak shift state of an input data 11 output from each VFO circuits. Correcting instruction signals 16 and 17 are generated to correct the synchronous counter of the other VFO circuits by substituting the counter value of the synchronous counter of the VFO circuit selected by the adjusting circuit 110 for the synchronous counter of the other VFO circuits.

16 Claims, 14 Drawing Sheets

INTEGRATING OF
ABERRATION

WHEN REACHING
THE PREDETERMINED
VALUE, FREQUENCY
IS CHANGED.

Fig.8

SIGNALS REPRESENTING THE PEAK SHIFT ARE GIVEN AS FOLLOWS:
SIGNAL REPRESENTING A RIGHT SHIFT CLOCK BIT: RC
SIGNAL REPRESENTING A RIGHT SHIFT DATA BIT: RD
SIGNAL REPRESENTING A LEFT SHIFT CLOCK BIT: LC
SIGNAL REPRESENTING A LEFT SHIFT DATA BIT: LD
STA (3:0) = RC&RD&LC&LD

| STAOLD SIGNAL (25), (210) | STA SIGNAL (113), (114) | CONTRADICTION REPRESENTING SIGNAL (213), (214) |
|---|---|---|
| 0000 | 0000 | 0 |
|  | 0001 | 0 |
|  | 0010 | 0 |
|  | 0100 | 0 |
|  | 1000 | 0 |
| 0001 | 0000 | 0 |
|  | 0001 | 1 |
|  | 0010 | 0 |
|  | 0100 | 1 |
|  | 1000 | 1 |
| 0010 | 0000 | 0 |
|  | 0001 | 1 |
|  | 0010 | 1 |
|  | 0100 | 1 |
|  | 1000 | 0 |
| 0100 | 0000 | 0 |
|  | 0001 | 0 |
|  | 0010 | 0 |
|  | 0100 | 1 |
|  | 1000 | 1 |
| 1000 | 0000 | 0 |
|  | 0001 | 0 |
|  | 0010 | 0 |
|  | 0100 | 1 |
|  | 1000 | 1 |

Fig.9

| WINDOW | 0 | | | | | | | | | | | | 1 | | | | | | | | | | | |
|---|---|---|---|---|---|---|---|---|---|---|---|---|---|---|---|---|---|---|---|---|---|---|---|---|
| COUNTER VALUE | 0 | 1 | 2 | 3 | 4 | 5 | 6 | 7 | 8 | 9 | A | B | 0 | 1 | 2 | 3 | 4 | 5 | 6 | 7 | 8 | 9 | A | B |
| RC | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 | 0 |
| RD | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| LC | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| LD | 0 | 0 | 0 | 0 | 0 | 0 | 0 | 0 | 0 | 0 | 0 | 0 | 1 | 1 | 1 | 0 | 0 | 0 | 0 | 0 | 0 | 0 | 0 | 0 |

Fig. 13

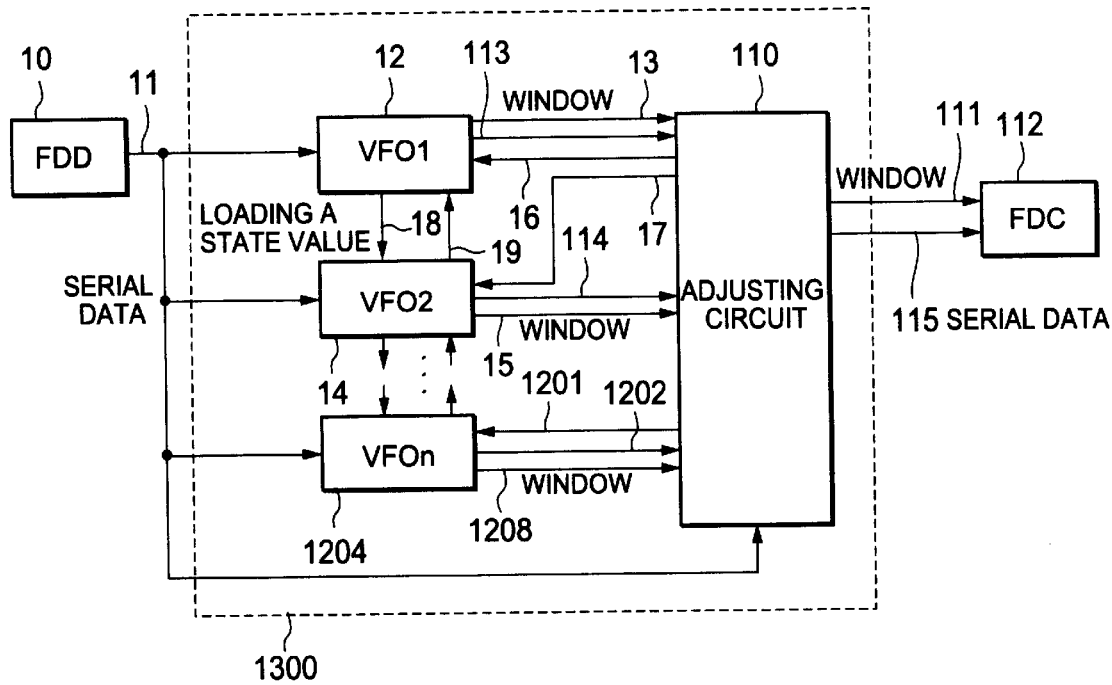

Fig. 14

SIGNALS REPRESENTING THE PEAK SHIFT ARE GIVEN AS FOLLOWS:
SIGNAL REPRESENTING A RIGHT SHIFT CLOCK BIT: RC
SIGNAL REPRESENTING A RIGHT SHIFT DATA BIT: RD
SIGNAL REPRESENTING A LEFT SHIFT CLOCK BIT: LC
SIGNAL REPRESENTING A LEFT SHIFT DATA BIT: LD
SIGNAL REPRESENTING A CLOCK BIT HAVING NO PEAK SHIFT: C
SIGNAL REPRESENTING A DATA BIT HAVING NO PEAK SHIFT: D
STA (5:0) = RC&RD&LC&LD&C&D

| STAOLD | STA | CONTRADICTION REPRESENTING SIGNAL |
|---|---|---|
|  | 000001 | 0 |
|  | 000010 | 0 |
| 000001 | 000100 | 0 |
|  | 001000 | 0 |
|  | 010000 | 0 |
|  | 100000 | 1 |
|  | ⋮ |  |

Fig.16

SIGNALS REPRESENTING THE PEAK SHIFT ARE GIVEN AS FOLLOWS:
SIGNAL REPRESENTING A RIGHT SHIFT CLOCK BIT: RC
SIGNAL REPRESENTING A RIGHT SHIFT DATA BIT: RD
SIGNAL REPRESENTING A LEFT SHIFT CLOCK BIT: LC
SIGNAL REPRESENTING A LEFT SHIFT DATA BIT: LD
SIGNAL REPRESENTING A CLOCK BIT HAVING NO PEAK SHIFT: C
SIGNAL REPRESENTING A DATA BIT HAVING NO PEAK SHIFT: D
STA (5:0) = RC&RD&LC&LD&C&D

| STAOLD2 | STAOLD | STA | CONTRADICTION REPRESENTING SIGNAL |
|---|---|---|---|
| 000001 | 000001 | 000001 | 0 |
|  |  | 000010 | 1 |
|  |  | 000100 | 1 |
|  |  | 001000 | 1 |
|  |  | 010000 | 0 |
|  |  | 100000 | 1 |

⋮

DIGITAL VFO DEVICE

BACKGROUND OF THE INVENTION

1. Field of the Invention

The present invention relates to a VFO device, and more particularly to a digital VFO device whereby the data can be read without retrying of reading even when a read error is occurred in reading data from a floppy disc drive device.

2. Description of the Prior Art

Variable Frequency Oscillator (hereinafter, referred to as "VFO") is well known particularly as one used for regenerating data of magnetic recording disc. This VFO is generally embodied using an analog circuit. Adjusting the values of resistors or capacitors must be carried out for the analog circuit, thereby complicating the design process. It is therefore well known that in designing an integrated circuit for the analog circuit, it is difficult to decrease the chip area of the integrated circuit.

It is also a well-known fact that the digitalization of VFO has been demanded recently with the development in digital techniques. For instance, in order to meet the demand, a first prior art VFO was disclosed through a Japanese Patent Laid-Open No. H3-227123 (a prior art document), which is digitalized by using a counter.

In the first prior art VFO circuits, every time a regenerated data is occurred, the value of counter is set to 6 so that the regenerated data is positioned in the center of High level width or Low level width of a output clock signal, whereby the phase correction is performed. For this reason, in case where the regenerated data includes a peak shift, which is a characteristic of magnetically recorded data, a wrong correction is performed, causing a problem that the data cannot be exactly regenerated.

FIG. 2 shows an example where the wrong correction is performed to a pair of peak shifts in the configuration of the first prior art VFO. In FIG. 2, the output clock signal shown in bold line represents the waveform when the wrong correction is carried out, and the output clock signal shown in dotted line represents the waveform when the correction is not carried out. It is assumed that data to be regenerated is "11" and peak shifts are occurred, where the two bits are spaced left and right from the center, respectively.

It is a general rule that the output clock signal must be output in High level timing when a regenerated data is generated as in case at a time t10 in FIG. 1. In the configuration of the prior art VFO shown in FIG. 1, in case where the peak shift is occurred, the regenerated data at a time t11 gets out of the High level timing of the output clock signal.

The above-mentioned prior art document further disclosed a second prior art VFO that overcomes the drawback in the first prior art.

This second prior art VFO changes only the period of WINDOW pulse according to the frequency difference detected based on the phase difference. Being different from the first prior art VFO that directly substitutes the count value, the second prior art VFO is not responsive to each bit, thereby not causing a wrong correction to the peak shift.

However, because this second prior art VFO is based on accumulation of phase difference for detecting the period, it cannot be sure that the period error is accurately detected.

FIG. 3 shows the configuration of the second prior art VFO that was disclosed in the prior art document. And FIG. 4 shows an example of a wrong frequency correction performed by this second prior art VFO.

Referring to FIGS. 3 to 4, in the second prior art VFO, an input data 94 is always positioned on the right of the center, with respect to an output data 99, so that the output of a phase difference detecting circuit 95 always becomes positive, and a frequency difference detecting circuit 96 accumulates this output of the circuits 95 and permits a frequency division ratio setting circuit 97 to carry out a setting for extending the frequency.

However, the input data 94 actually has a frequency shorter than the output clock signal 99, and it moves toward the center little by little from the right end of the output clock signal 99 as shown in FIG. 4. Consequently, it becomes wrong correction.

Like this, the two problems of peak shift and frequency error conflict with each other, and there have been suggested a few correction algorithms effective in coping with one of the two problems, but not with both the problems.

SUMMARY OF THE INVENTION

The present invention has been made in view of the problems of the prior arts and its object is to provide a novel digital VFO device which comprises one VFO circuit having a function of peak shift correction and another VFO circuit having a function of frequency error correction, that is, VFO circuits having different correcting characteristic, so as to enable reading data without its retry even when a read error is occurred in reading data from the floppy disc drive device.

In order to achieve the object, the present invention provides a digital VFO device outputting, as output signal, a window signal in a predetermined phase relation to an input data having a peak shift, the digital VFO device comprising:

a plurality of VFO circuits which receives the input data having the peak shift and outputs a signal representing a peak shift state of the input data;

a synchronous counter which is provided to each of the plurality of VFO circuits and has a correcting characteristic different from each other; and an adjusting circuit which selects one of the VFO circuits based on the signal representing the peak shift state of the input data, and outputs a correcting instruction signal to substitute a counter value of the synchronous counter of the selected VFO circuit for the synchronous counter of the other VFO circuit so as to correct the synchronous counter of the other VFO circuit, wherein the adjusting circuit comprises:

a data storaging circuit which is provided for each of the plurality of VFO circuits and storages a signal representing a peak shift state of a first input data which is input just before a second input data;

a detecting circuit which is provided for each of the VFO circuits to detect whether a peak shift of the second input data complies with a predetermined logic, based on both a data being storaged in the data storaging circuit and a signal representing a peak shift state of the second input data, and to output the correcting instruction signal to correct the counter value of the corresponding VFO circuit when it is detected not to comply with the predetermined logic; and a window pulse selecting circuit which selects one of the plurality of VFOs based on the detection result of the detecting circuit, and outputs, as an output signal, a WINDOW pulse of the selected VFO circuit.

Further, in order to achieve the object, the present invention provides a digital VFO device outputting, as output signal, a window signal in a predetermined phase relation to an input data having a peak shift, the digital VFO device comprising:

a plurality of VFO circuits which receives the input data having the peak shift and outputs a signal representing a peak shift state of the input data;

a synchronous counter which is provided to each of the plurality of VFO circuits and has a correcting characteristic different from each other; and an adjusting circuit which selects one of the VFO circuits based on the signal representing the peak shift state of the input data, and outputs a correcting instruction signal to substitute a counter value of the synchronous counter of the selected VFO circuit for the synchronous counter of the other VFO circuit so as to correct the synchronous counter of the other VFO circuit, wherein the adjusting circuit comprises:

a first data storaging circuit which is provided for each of the plurality of VFO circuits and storages a signal representing a peak shift state of a first input data which is input just before a second input data;

a second data storaging circuit which is provided for each of the plurality of VFO circuits and further maintains a signal representing a peak shift state of an input data just before the data being storaged in the firsts data storaging circuit;

a detecting circuit which is provided for each of the VFO circuits to detect whether a peak shift of the second input data complies with a predetermined logic, based on both a data being storaged in the first and second data storaging circuit and a signal representing a peak shift state of the second input data, and to output the correcting instruction signal to correct the counter value of the corresponding VFO circuit when it is detected not to comply with the predetermined logic; and a window pulse selecting circuit which selects one of the plurality of VFOs based on the detection result of the detecting circuit, and outputs, as an output signal, a WINDOW pulse of the selected VFO circuit. The present invention can be applied to various preferred types of digital VFOs as follows.

That is, the present invention may provide a digital VFO device, wherein one of the plurality of VFO circuits has priority, and when the detecting circuit does not output the detection result, a WINDOW pulse output from the VFO circuit having priority is output as the output signal.

Further, the present invention may provide a digital VFO device, wherein the signal representing the state of the peak shift of the input data includes at least a bit representing a right-shifted state of a clock signal, a bit representing a left-shifted state of a clock signal, a bit representing a right-shifted state of a data signal, and a bit representing a left-shifted state of a data signal.

In addition, the present invention may provide a digital VFO device, wherein the output of the input data from the device is delayed by one system clock of the device, and also the output of the WINDOW pulse is delayed by one system clock of the device.

BRIEF DESCRIPTION OF THE DRAWINGS

FIG. 8 is a view for explaining an example of a decoder's logic.

FIG. 9 is a view showing an example of the pattern of signal representing the peak shift states of data and clock.

FIG. 13 is a block diagram showing the configuration of an adjusting circuit of a second embodiment.

FIG. 14 is a view showing a third embodiment where illustrated is an example, of the logic of decoder in case of extending the signal representing the peak shift state of data and clock to 6 bits.

FIG. 16 is a view showing an example of logic of decoder in the fourth embodiment of the present invention.

DETAILED DESCRIPTION OF THE PREFERRED EMBODIMENT

Figure 1:
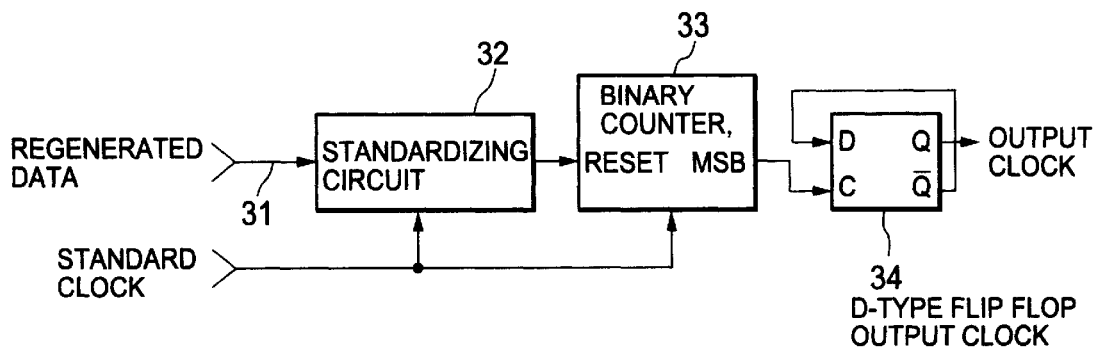
FIG. 1 is a block diagram showing the configuration of a prior art VFO disclosed by Japanese Patent Laid-Open No. H3-227123.

A description will now be made of the prior art VFO disclosed in the prior art document. FIG. 1 shows the configuration of a first prior art VFO disclosed in the prior art document.

Referring to FIG. 1, a regenerated data 31 of the first prior art VFO is a signal output from the floppy disc drive device, and a standardization circuit 32 of the prior art VFO generates, by the input standard clock, a standard data having one clock width of the standard clock from the regenerated data 31.

A counter circuit 33 of the first prior art VFO is a binary counter that has a reset function and increases the counter value by the standard clock, where MSB represents the uppermost bit. A D-type flip-flop 34 performs two frequency-division of the output of the counter circuit 33 for generating the output clock signal. The output clock signal shown in FIG. 1 corresponds to the below-mentioned WINDOW pulse 111 of the present invention.

As an example, a case will be described as follows, where the data transmission rate of the first prior art VFO is given as 500 Kbps, and the standard clock shown in FIG. 1, which corresponds to a system clock CLK of the present invention shown in FIG. 7, is given as 12 MHz. In this case, when the period of the counter 33 which generates the output clock signal is given as "12" in decimal notation, the period of the input data coincides with that of the output clock signal.

In the first prior art VFO shown in FIG. 1, every time a regenerated data is occurred, the value of counter is set to 6 and the phase correction is performed in order that the regenerated data is positioned in the center of High level width or Low level width of the output clock signal.

For this reason, in case where the regenerated data includes a peak shift that is a characteristic of magnetically recorded data, a wrong correction is performed, causing a problem that the data cannot be exactly regenerated.

Figure 2:
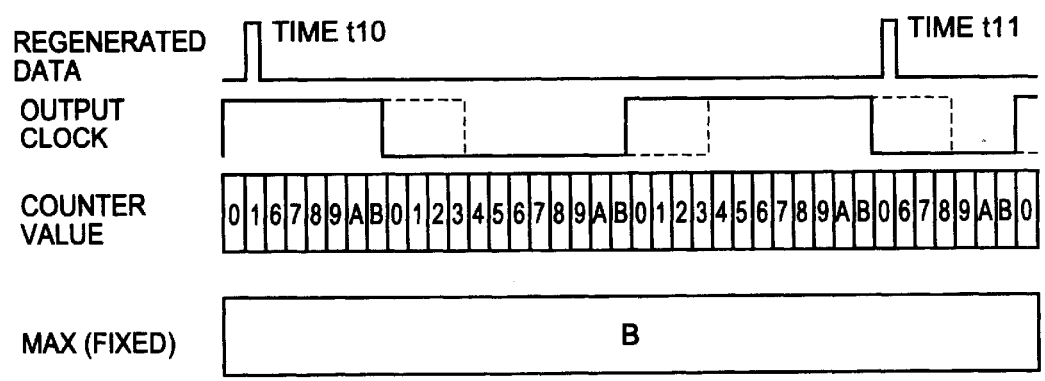
FIG. 2 is a view showing an example of a wrong phase correction performed by the prior art VFO device shown in FIG. 1.

FIG. 2 shows an example where the wrong correction is performed to a pair of peak shifts in the configuration of the first prior art VFO. In FIG. 2, the output clock signal shown in bold line represents the waveform when the wrong correction is carried out, and the output clock signal shown in dotted line represents the waveform when the correction is not carried out. It is assumed that data to be regenerated is "11" and peak shifts are occurred, where the two bits are spaced left and right from the center, respectively.

It is a general rule that the output clock signal must be output in High level timing when a regenerated data is generated as in case at a time t10 in FIG. 1. In the configuration of the prior art VFO shown in FIG. 1, in case where the peak shift is occurred, the regenerated data at a time t11 becomes out of the High level timing of the output clock signal.

Figure 3:
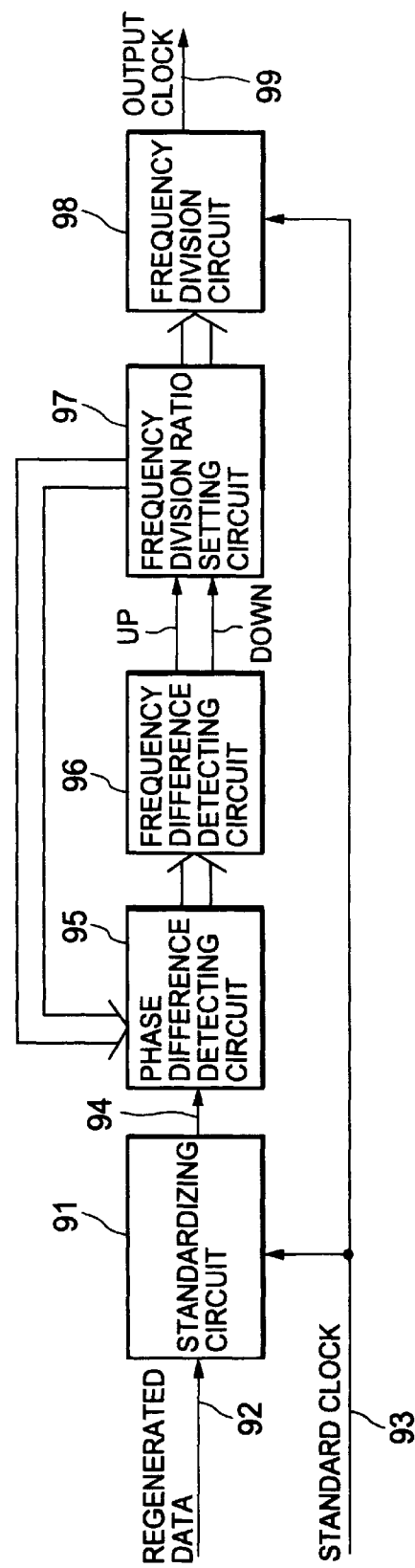
FIG. 3 is a block diagram showing the configuration of another prior art VFO disclosed by Japanese Patent Laid-Open No. H3-227123.

FIG. 3 shows the configuration of the second prior art VFO that was disclosed in the prior art document.

Referring to FIG. 3, the regenerated data 92 from the drive device of the second prior art VFO is standardized to a pulse 94 with a length of one clock of the system clock 93 by the standardization circuit 91. The phase difference detecting circuit 95 detects a phase difference between the pulse 94 and the output clock signal 99. The output clock signal 99 corresponds to the WINDOW pulse 111 of the present invention.

The detected phase difference is accumulated as a signed value by the frequency difference detecting circuit 96. For instance, when the phase difference is negative, the value stored in the frequency difference detecting circuit is set to −1, and when the phase difference is positive, the value stored in the frequency difference detecting circuit is set to +1.

When the value of the frequency difference detecting circuit 96 reaches a predetermined value, the frequency difference detecting circuit 96 outputs up or down instructions of the frequency division ratio to the frequency division setting circuit 97. The frequency division circuit 98 outputs the output clock signal 99 with a predetermined period according to the setting value of the frequency division setting circuit 97. This procedure corresponds to changing the maximum value (period) of the counter that generates WINDOW pulse in the digital VFO.

This second prior art VFO changes only the period of WINDOW pulse according to the frequency difference detected based on the phase difference.

Being different from the first prior art VFO which directly substitutes the count value, the second prior art VFO is not responsive to each bit, thereby not causing a wrong correction to the peak shift.

However, because this second prior art VFO is based on accumulation of phase difference for detecting the period, it cannot be sure that the period error is accurately detected.

Figure 4:
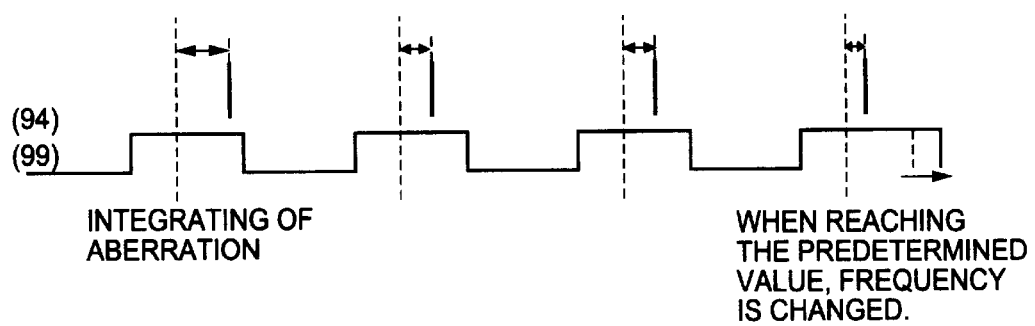
FIG. 4 is a view showing an example of a wrong period correction performed by the prior art VFO device shown in FIG. 3.

FIG. 4 shows an example of a wrong frequency correction performed by this second prior art VFO.

Referring to FIG. 4, in the second prior art VFO, an input data 94 is always positioned on the right of the center, with respect to an output data 99, so that the output of a phase difference detecting circuit 95 always becomes positive, and a frequency difference detecting circuit 96 accumulates this output of the circuit 95 and permits a frequency division ratio setting circuit 97 to carry out a setting for extending the frequency.

However, the input data 94 actually has a frequency shorter than the output clock signal 99, and it moves toward the center little by little from the right end of the output clock signal 99 as shown in FIG. 4. Consequently, it becomes wrong correction.

A description will be made as follows of embodiments of the digital VFO device according to the present invention with reference to the figures.

The digital VFO device according to the present invention uses a plurality of digital VFOs, each having different characteristic, in decoding the data by the digital VFO when regenerating the serial data. Namely, the present invention is characterized in that it is provided with a VFO circuit having a correcting function for the peak shift and another VFO circuit having a correcting function for the frequency error; a judgment is then carried out whether each VFO is correct, simultaneously with the decoding operation; and then only the decoding result of the right VFO is provided to the floppy disc controller, while the wrong VFO is simultaneously loaded with the-status value of right VFO, returning to the right one.

Figure 6:
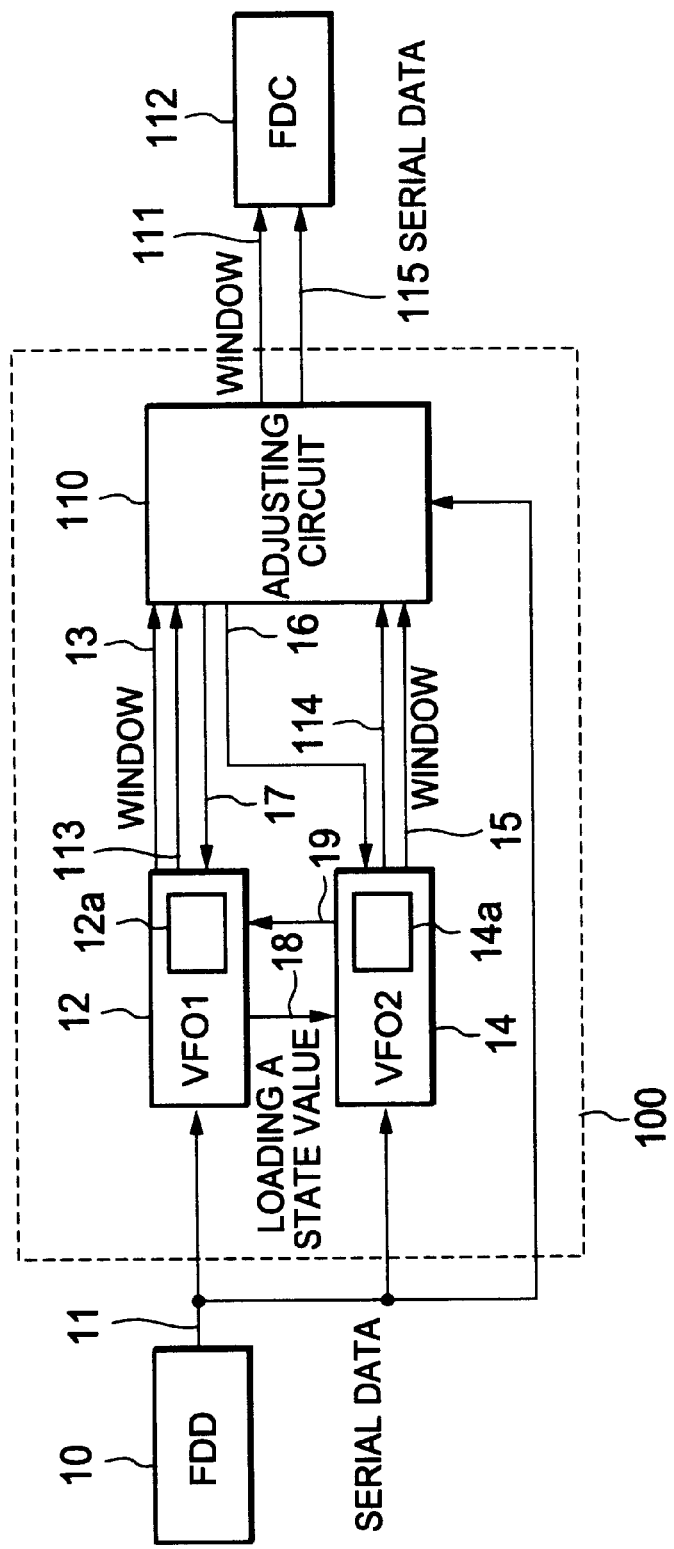
FIG. 6 is a view showing the configuration of the present invention.

FIG. 6 shows an example of the configuration according to the present invention wherein two VFOs are employed.

In the digital VFO device of the present invention, as shown in FIG. 6, a serial data 11 from a disc drive 10 is input to two digital VFOs, that is, a VFO 12 and a VFO 14. The VFO 12 and the VFO 14 generate a WINDOW pulse 13 and a WINDOW pulse 15, respectively, according to each algorithm.

In the digital VFO of the present invention, when the serial data 11 is generated from the disc drive 10, an adjusting circuit 110 judges whether the WINDOW pulse 13 and WINDOW pulse are right in case where the counter value of the WINDOW pulse 13 is different from that of the WINDOW pulse 15, and then the WINDOW pulse which is judged to be right is output, as a final result 111, to the floppy disc controller 112.

At this time, the counter value of the VFO judged to be right is substituted for the VFO judged to be wrong, so that the counter value of the wrong VFO returns to the right value. The VFO 12 and the VFO 14 are loaded with the status value of the right one of them by the status value load signals 16 and 17, respectively, which are output from the adjusting circuit 110.

Like this, in the present invention, adjustment is carried out for a plurality of VFO adjustment, and a WINDOW pulse and a data in right phase are sent to the controller, while the VFO which falls into the wrong state is returned to the right state in result that most suitable WINDOW pulse is always output to the floppy disc controller 112.

Embodiments

Hereinafter, a detailed description will be made of embodiments of the digital VFO device according to the present invention with reference to the drawings.

First Embodiment

FIGS. 6 to 12 shows the first embodiment of the digital VFO device according to the present invention. As shown in these figures, there is provided with a digital VFO device 100 that outputs as an output signal a WINDOW pulse in a predetermined phase relation to the input data 11 having the peak shift. The digital VFO device 100 comprises a plurality of VFO circuits 12 and 14 which receive the input data 11 and output signals indicating the state of peak shift; synchronous counters 12a and 14a which are installed in the plurality of VFO circuits 12 and 14 and have different correcting characteristics; and the adjusting circuit 110 which selects one of the plurality of VFO circuits 12 and 14 based on signal indicating the state of peak shift in the input data 11, and outputs correction instruction signal for correcting the synchronous counter of the second VFO circuit by substituting the counter value of the synchronous counter of the selected VFO circuit for the synchronous counter of the second VFO circuit.

As shown in these figures, the digital VFO device is also characterized in that its adjusting circuit 110 comprises a data storaging circuit 26 which is provided for each VFO circuit to maintain a signal STAOLD indicating the state of peak shift of a first input data just before a second input data 11; detecting circuits 27 and 23 which are provided for each VFO circuit to detect whether the peak shift of the second input data 11 complies with a predetermined logic, based on both the data storaged in the data storaging circuit 26 and the signal STA indicating the state of the peak shift of the second input data 11, and to output the correction instructing signal 17 for correcting the counter value of the synchronous counter 12a of the corresponding VFO circuit 12 when detecting it is not in the state of the predetermined logic; and window pulse selecting circuits 220, 221, 22 which select one of the plurality of VFO circuits based on the detecting result of the detecting circuits and output as an output signal the WINDOW pulse of the selected VFO circuit 14.

FIG. 6 shows the system configuration of the digital VFO device of the first embodiment according to the present invention.

As shown in FIG. 6, the digital VFO device 100 of the first embodiment comprises the first VFO 12 which receives the serial data 11 from the floppy disc drive 10; the second VFO 14 which receives the serial data 11 from the floppy disc drive 10 and also receives the state value of the VFO 12; and the adjusting circuit 110 which receives the serial data 11 from the floppy disc drive 10 and also receives both the WINDOW pulse 13 the VFO 12 generates for the serial data 11 and the WINDOW pulse 15 the VFO 14 generates for the serial data 11.

Further, the adjusting circuit 110 of the digital VFO device 110 of the first embodiment outputs the signal 17 to the VFO 12 for allowing the VFO 12 to be loaded with the state value 19 of the VFO 14 and the signal 16 to the VFO 14 for allowing the VFO 14 to be loaded with the state value 18 of the VFO 12, and then the WINDOW pulse 111 selected by the adjusting circuit 110 is output to the floppy disc controller 112.

Here, because the digital VFO makes the WINDOW pulse based on the value of the synchronous counter, the state value 18 of the VFO 12 and the state value 19 of the VFO 14 are given as their counter values. The VFO 12 and the VFO 14 are digital VFOs having different correction algorithms, while the clocks synchronous with their counter and the periods of their counters are required to be the same.

In addition, when receiving the data 11, each VFO judges whether a peak shift is included in bits of the data 11, based on its phase relation to the WINDOW pulse, and then provides the adjusting circuit 110 with the signals 113 and 114 representing the peak shift state of the bits.

The signal 11 from the disc drive 10 is supplied to the VFOs 12 and 14. The VFOs 12 and 14 perform phase and period corrections for the input data 11 with each algorithm, and then generate WINDOW pulses 13 and 15.

The adjusting circuit 110, which is provided according to the present invention, carries out the adjustment for the processed data when results of WINDOW 13 and WINDOW 15 with respect to the input data 11 are different, and supplies, as a final result 111, the WINDOW judged to be right to the floppy disc controller 112.

At this time, the VFO in wrong state is loaded with the value of VFO that has been judged in right state.

When performing adjustment of the WINDOW pulse, the adjusting circuit 110 simultaneously generates the state load signal 16 or the state load signal 17.

In the example shown in FIG. 6, the load signal 17 represents a signal enabling the VFO 12 to be loaded with the value of the VFO 14, and the load signal 16 represents a signal enabling the VFO 14 to be loaded with the value of the VFO 12. Namely, when the load signal 17 is active, the VFO 12 is loaded with the state value 19 of the VFO 14, and when the load signal 16 is active, the VFO 14 is loaded with the state value 18 of the VFO 12.

Figure 7A:
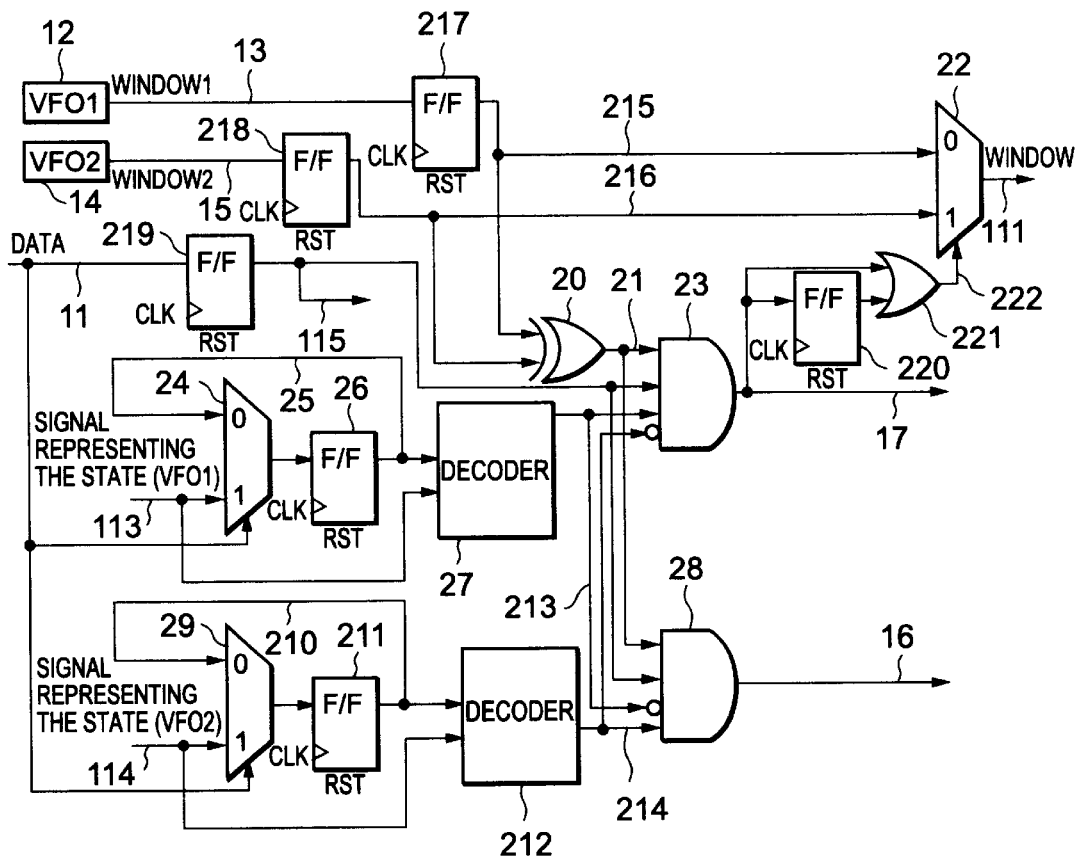
FIG. 7a is a block diagram showing the configuration of an adjusting circuit of a first embodiment.
Figure 7B:
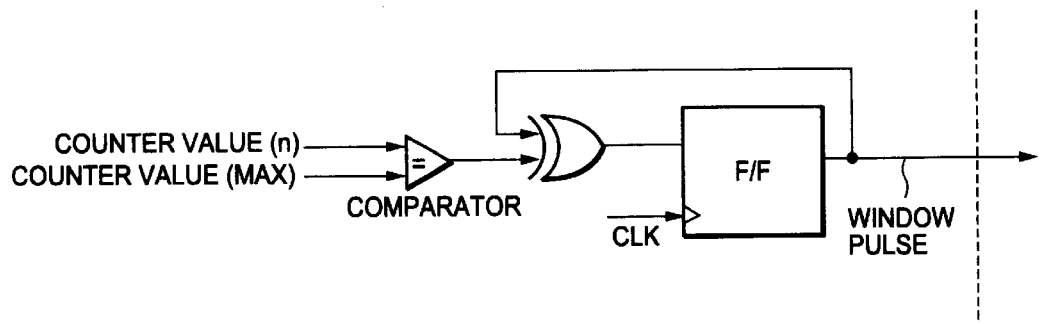
FIG. 7b is a block diagram of the counter.

FIG. 7a is a detailed block diagram showing an example of the configuration of the adjusting circuit 110 of FIG. 6, and FIG. 7b is a block diagram showing the counter.

Referring to FIG. 7, the adjustment 110 comprises a multi-bit flip-flop 26 and a multi-bit flip-flop 211, which are registers respectively storaging a signal 113 or a signal 114 when the data 11 from the drive is active. Here, the signal 113 and the signal 114 are multi-bit signals which represent whether the data input from the VFOs 12 and 14 includes the peak shift, respectively, or represent in which direction it is, in case where there is a peak shift.

In addition, the adjusting circuit 110 is provided with a decoder 27 and a decoder 212 which activates, respectively, the output signal 213 and the output signal 214 when each of two rounds of value of the signal 113 and the signal 114 does not comply with the peak shift generation rule by the twice value.

Since definite decisions of the signal 113 and the signal 114 are made after receiving the DATA 11, in the configuration shown in FIG. 7, adjustment of WINDOW 15 is carried out at timing of a signal 115 obtained by delaying the DATA 11 by one clock. A signal 215 obtained by delaying the WINDOW 13 by one clock and a signal 216 obtained by delaying the WINDOW 15 by one clock are used for the timing adjustment.

When the signal obtained by delaying the DATA 11 by one clock is occurred, the values of the two WINDOW pulse 215 and 216 become not coincident with each other, and when the signal 213 is active and the signal 214 is inactive, the signal 17 becomes active through an AND gate 23. The signal 17 becomes a signal 222 with two clock length, and the WINDOW pulse 216 selected by the selector 22 is output to the controller, based on the signal 222.

At this time, the signal 17 is output to the VFO 12 and serves as a load signal enabling the VFO 12 to be loaded with the state value (counter value: 19) of the VFO 14.

Likewise, the VFO 14 is loaded with the value 18 of the VFO 12 when the signal 16 is active.

The configuration example shown in FIG. 6 is a case where priority is given to the VFO 12 as an output of VFO. It is configured so that the WINDOW pulse 215 is transmitted to the controller in cases where the values of the WINDOW pulses are coincident with each other, where the VFO 12 and the VFO 14 are out of the peak shift generation rule, or where both of them are not out of the rule but are not coincident with each other.

FIG. 8 shows an example of the truth values of the truth table of decoder, which are used in the decoders 27 and 212.

The signal 113 of the VFO 12 and the signal 114 of the VFO 14, which represent the peak shift and are referred to as "STA (3:0)", include a signal RC representing a left shift clock bit, a signal RD representing a right shift data bit, a signal LC representing a left shift clock bit, and a signal LD representing a left shift data bit.

Because, in digital VFO, the WINDOW pulse is formed based on the value of the counter, it can be judged that if the counter value when input data 11 is input is less than a predetermined reference value, it means a left peak shift, while if it is more than the predetermined reference value, it means a right peak shift, and in this manner signals RC, RD, LC, LD are generated. Also, it can be judged that if the value of the WINDOW pulse is "1", it means a data bit, and if the value of the WINDOW pulse is "0", it means a clock bit.

In the above-mentioned example, it is supposed that "there are no two continuous peak shifts in same direction" and "next to the left peak shift, its different type of bit does not follow". In addition, in case where the data is generated, if two rounds of value of STA (3:0), which is a combination of the signal 113 representing the state of peak shift of VFO 12 and the signal 25 representing the state of peak shift at one clock before, or a combination of the signal 114 representing the state of peak shift of VFO 14 and the signal 210 representing the state of peak shift at one clock before, does not comply with the peak shift generation rule mentioned above, the signal 17 or the signal 16 indicating that there is contradiction in the side where the peak shift appears becomes active.

Figure 12:
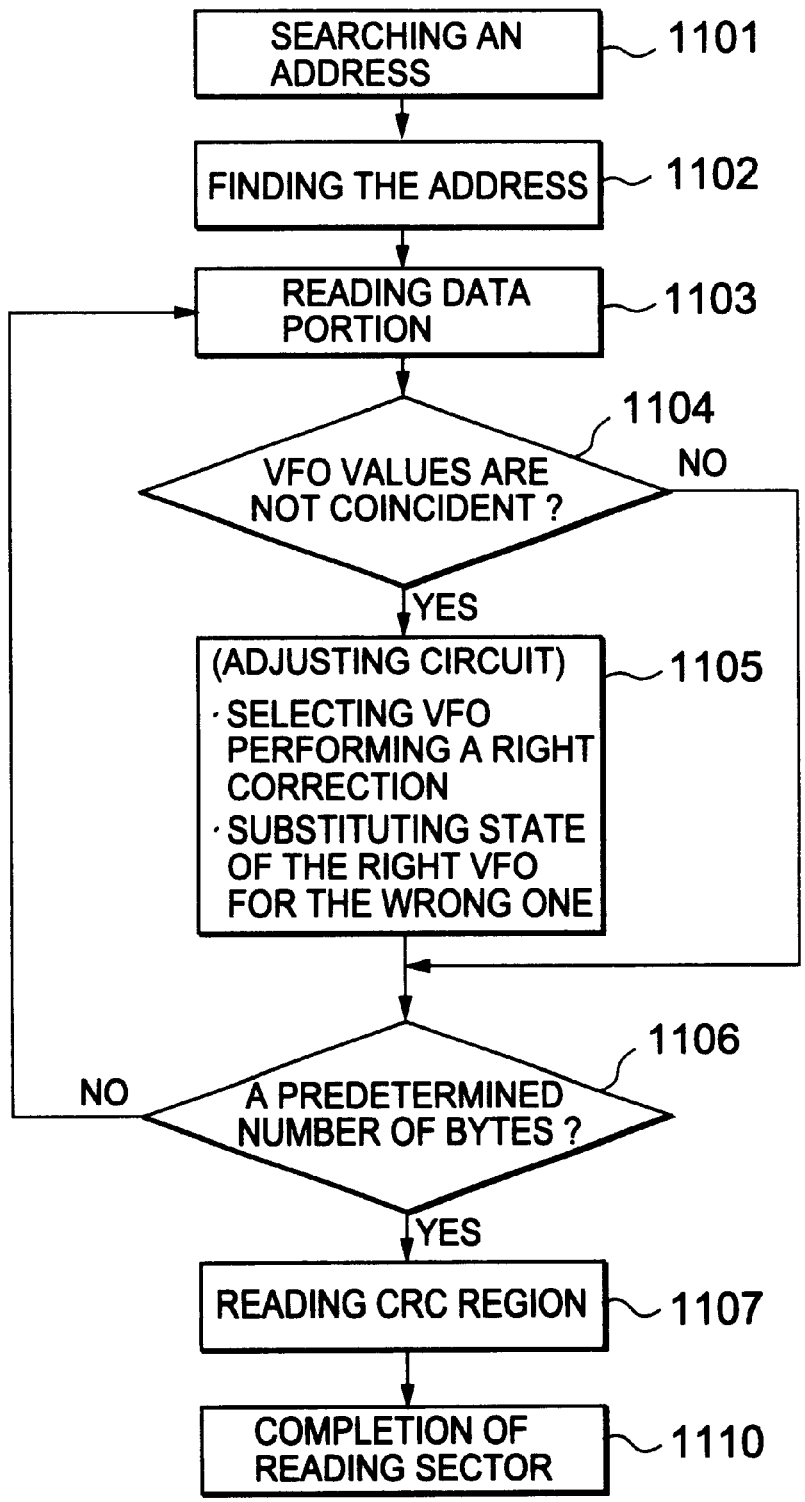
FIG. 12 is a flow chart for explaining the operation of the present invention.

FIG. 12 is a flowchart showing the sector read procedure in the floppy disc according to the present invention. With reference to FIG. 12, the operation of the present invention will be described hereinafter.

First, when the system is to read a data of a sector, the address of the desired sector is firstly searched (1101).

The address portion of each sector is consecutively read, and when the value of the read address portion is coincident with the desired sector, it is found to be the corresponding address (1102), and then the procedure is moved to the reading step of data portion (1103).

When values of plurality of VFOs provided in the present invention are different from each other during reading the data portion, a process (1105) is performed through the branch step (1104). Here, as already described referring to FIGS. 6 and 7, selected is the value of VFO which has been judged to provide a right value, and the state value in the VFO which has been judged to be right is substituted for the VFO which has been judged to provide a wrong value.

The above processes are repeated and when reading of the predetermined number of bytes has been reached, the procedure is moved to a CRC region reading process (1107) through a branch step (1106).

It is then confirmed that the value of CRC recorded at the final portion of sector is coincident with the value calculated by floppy disc controller, thereby completing the reading of sector (1110).

The operation of this embodiment will now be described as follows.

In each configuration shown in FIGS. 6 and 7, when the transmission rate of the read data 11 is 500 Kbps and the operation clock of VFO is 12 MHz, the VFO 12 and the VFO 14 shown in FIG. 6 operate as a duodecimal counter, and when it is constituted so that the WINDOW pulse 13 and the WINDOW pulse 15 are reversed by a circulation of the counter, the data transmission rate is coincident with the period of the WINDOW pulse.

Occurrence of the input data 11 when each of the counter of the VFO 12 and the counter of the VFO 14 is in 5 makes an ideal phase relation where there are no error both the peak shifts and the transmission rate.

According to the table of FIG. 8, the decoder 27 and the decoder 212 generate respectively the signal 213 and the signal 214.

In addition, the VFO 12 and the VFO 14 transmit respectively the signal 113 and the signal 114 representing the peak shift generation state to the adjusting circuit 110.

According to the table of FIG. 9, each of the signal 113 and the signal 114 is generated by the counter value of VFO when the serial data 11 is generated.

Referring to the timing view of FIG. 10, a description will now be made of an example of adjustment process for a disagreement between the VFO 12 and the VFO 14.

This corresponds to the process (1105) that is performed after "YES" is determined in the branch step (1104) referring to the flowchart of FIG. 12.

Figure 10:
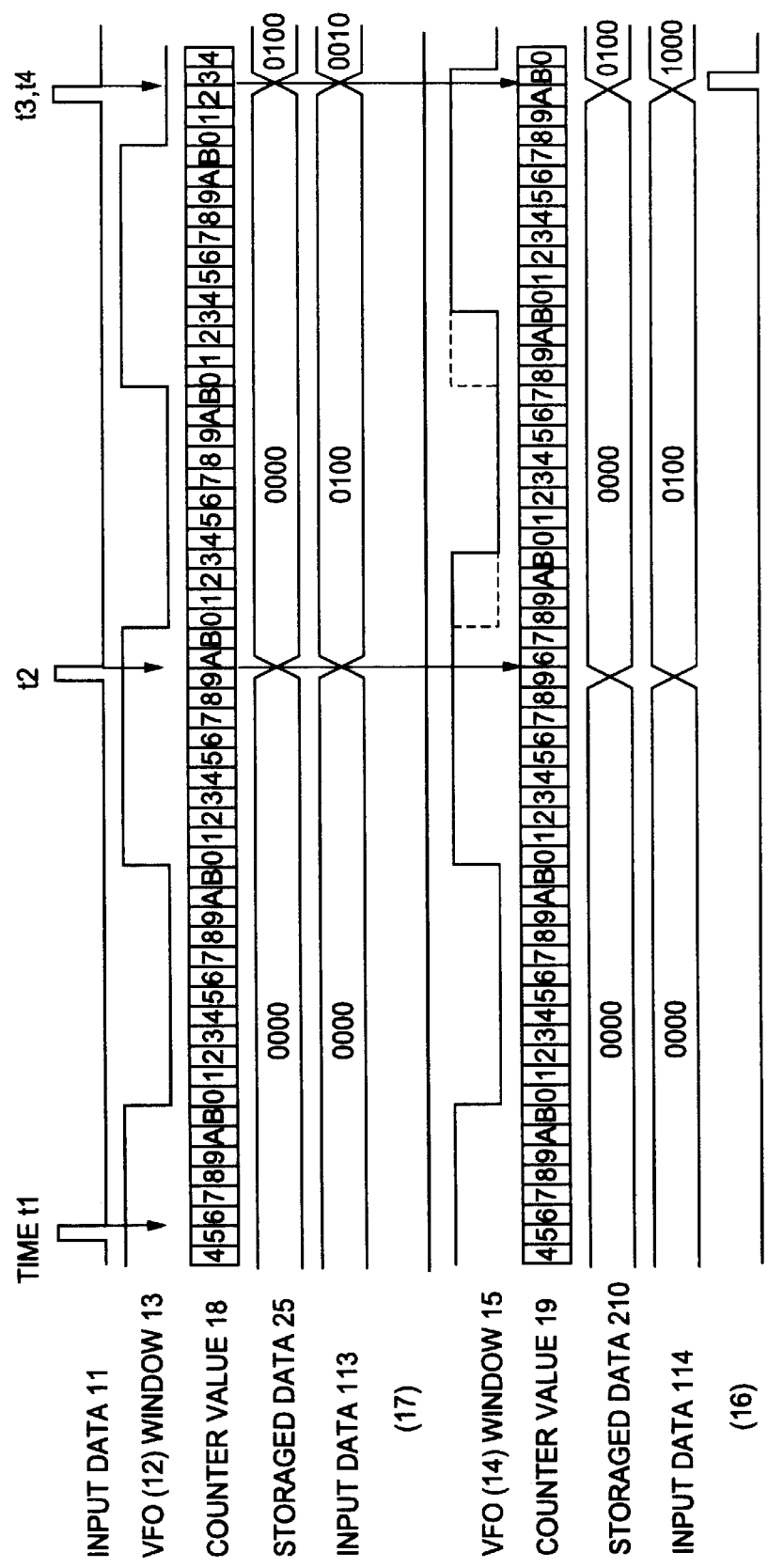
FIG. 10 is a view showing the operation timing.

Within a range of FIG. 10, the bit string of the input data is given as "1100", and the input data from the drive includes a data bit occurred at each time t1 and t2, and a clock bit occurred at a time t3. A time t4 denotes one system clock later from the time t3.

Due to the peak shift generation rule in MFM Modulation mode, the data bit at the time t2 is peak-shifted right, and the clock bit is peak-shifted left, while the data bit at the time t1 is not peak-shifted. Further it is assumed that there is no error in the transmission rate.

Both the VFO 12 and the VFO 14 is assumed to be in ideal phase relation to the data bit at time t1. Namely, both the counter value of the VFO 12 and the counter value of the VFO 14 are "5" when the data bit is occurred at the time t1, and they are "6" one clock later. At this time, it becomes that STA (3:0)="0000", based on the table of FIG. 9.

Thereafter, the data bit occurred at the time t2 is peak-shifted right, and when this bit arises, both the counter values of both the VFOs becomes "9". Here, the VFO 12 and the VFO 14 have different correction algorithms, where the VFO 12 does not carry out correcting process at this time but substitutes "A" for the counter value at next clock, while the VFO 14 carries out correcting process for this input data to be positioned at the center of WINDOW, and substitutes "6" for the counter value at next clock. Because this is judged as a right peak shift according to the table of FIG. 9, each value of the signals 113 and 114 representing the peak shift generation state becomes "0100".

Thereafter, when a left peak-shifted clock bit is occurred at time t3, the VFO 12 is allowed to generate a WINDOW pulse 13 in a right phase relation to the input data 11 because it doesn't carry out the phase correcting process at time t2. On the other hand, the VFO 14 carries out a wrong correction for the peak shift at time t2, and falls into correcting the left peak-shifted clock bit as the right peak-shifted data bit. That is, the state value 210 is loaded with the value of the previous signal 114 representing the peak shift generation state, and the signal 114 representing the peak shift generation state returns to "1000" as it was according to the table of FIG. 9. Consequently, it is judged that there are two consecutive right peak-shifted data bits.

The adjusting process is carried out one clock later from occurrence of the input data 11, and it is judged that the VFO 14 is in abnormal operation, activating the signal 16. At this signal timing, the value of the WINDOW pulse and the counter value of the VFO 12 are substituted for the counter value of the VFO 14, in result that the VFO 14 returns to the right state.

Further, in FIG. 10, the description has been made for an example where the VFO 14 in lower priority is wrong, but when it is judged that the VFO 12 is wrong, the signal 17 becomes active instead of the signal 16 of FIG. 10. Although the signal 17 is active only during one clock, it become a signal 222 extended to two clock through a flip-flop 220 and an OR gate 221, and using this signal 222, the signal 216 which is formed by delaying the WINDOW pulse 15 of the VFO 14 by one clock is transmitted to the controller.

In addition, when the signal 17 is active, the VFO 12 is loaded with the state value 19 of the VFO 14. The WINDOW pulse of the VFO 14 which has been judged to be right is selected as the WINDOW pulse 111 to be transmitted to the controller during two clock period, but two clock later, the signal 215 formed by delaying again the WINDOW pulse 13 of the VFO 12 by one clock is selected in the WINDOW pulse 111.

During two clock period when the WINDOW pulse 216 is selected, loading of the state value is carried out for the VFO 12, which is also reflected on the one-clock delayed signal 215, and therefore without being interrupted, the WINDOW pulse in right phase relation is selected to be transmitted to the controller.

Figure 11:
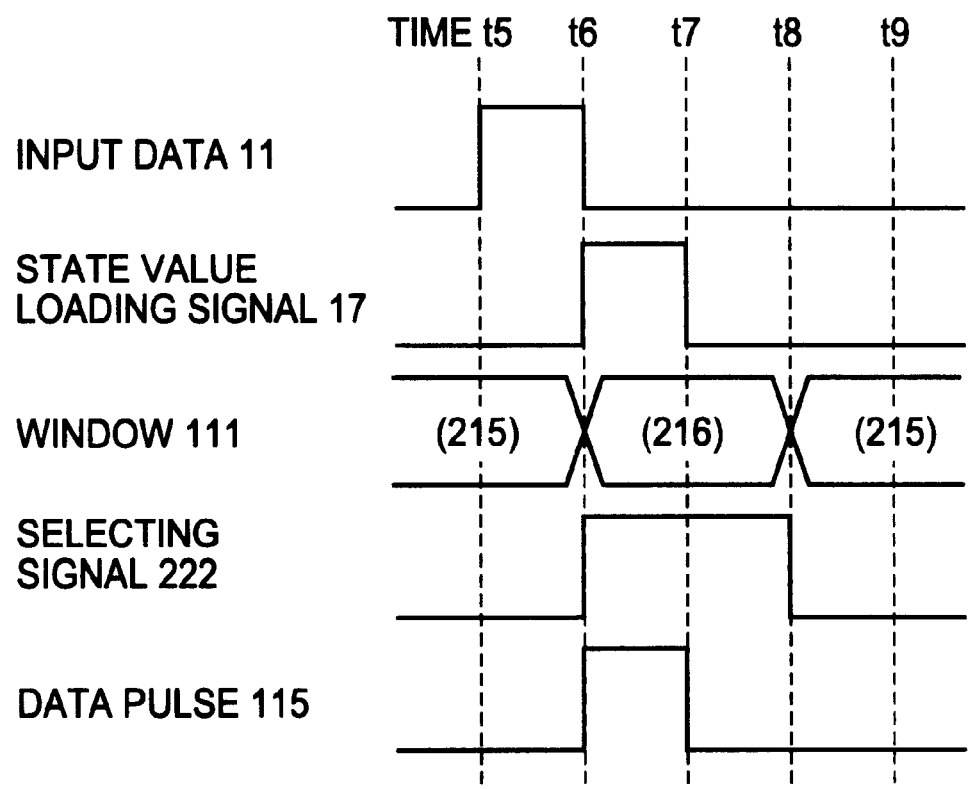
FIG. 11 is a view showing the output timing.

FIG. 11 is a timing view showing this operation.

At a time t6, the VFO 12 is judged to be wrong, and the signal 17 arises. Simultaneously, the signal 216 formed by delaying by one clock the WINDOW 15 generated by the VFO 14 is selected for the WINDOW 111 by the signal 222.

Receiving the signal 17, the VFO 12 at the time t7 is loaded with the state value 19 of the VFO 14, but because the signal 222 is still active, the WINDOW pulse 216 is still output for the WINDOW pulse 111.

At the time t8, the signal 222 becomes active and the signal 215 is selected for the WINDOW pulse 111. However, because the VFO 12 and the VFO 14 are in the same state one clock before, with respect to the one-clock clock delayed signal 215 it becomes that "215=216", and therefore without being interrupted, the WINDOW pulse 111 in right state is selected and transmitted to the controller.

In this configuration, because with respect to the WINDOW pulse to be transmitted to the controller, the WINDOW pulse formed before passing through the adjusting circuit is delayed by one clock, also the data pulse 115 to be transmitted to the controller uses, for timing adjustment, the signal formed by delaying the regenerated signal 11 of the drive by one clock.

Second Embodiment

FIG. 13 shows the configuration of a second embodiment.

In the first embodiment, the description was made of a case of using two VFOs. However, without being limited to two VFOs, the same configuration may be applied to any number of VFOs. In this case, it is constituted so that its priority degree is assigned to each VFO, and when a VFO in upper priority degree is judged to be wrong and a VFO in lower priority degree is judged to be correct, a WINDOW pulse generated by the right VFO is transmitted to the controller and its state value is loaded to other VFOs.

Third Embodiment

FIG. 14 shows the configuration of a third embodiment.

In the first embodiment, the signal representing the peak shift includes a signal RC representing a left shift clock bit, a signal RD representing a right shift data bit, a signal LC representing a left shift clock bit, and a signal LD representing a left shift data bit. However, this embodiment is constituted so as to express a non-peak shift bit when every bit is 0. That is, it is constituted so as to extend STA (5:0) and express a non-peak shift clock bit C and a non-peak shift data bit D.

Thus, in addition to the prior error judgment algorithm that "There are no two consecutive peak shifts in same direction" and "No right peak-shifted data (clock) bit is appeared next to a right peak-shifted clock (data) bit", a consideration can be added that "No right peak-shifted data (clock) bit is appeared next to a non-peak shift clock (data) bit". FIG. 14 shows a portion of an example of a decoder logic employing this STA (5:0). This corresponds to the decoder operated by the logic of FIG. 8.

In the decoder operated according to the logic of FIG. 8, when peak shift is not occurred, it becomes that STA (3:0)="0000", and any next generated bit is not judged to be wrong no matter in which state the bit is. However, when STA is enlarged to 6 bit, it becomes that STA (5:0)= "000001" or STA (5:0)="000010" even when there is no peak shift, and it is judged to be wrong by the state of next bit as the decoder of FIG. 1.

Fourth Embodiment

Figure 15:
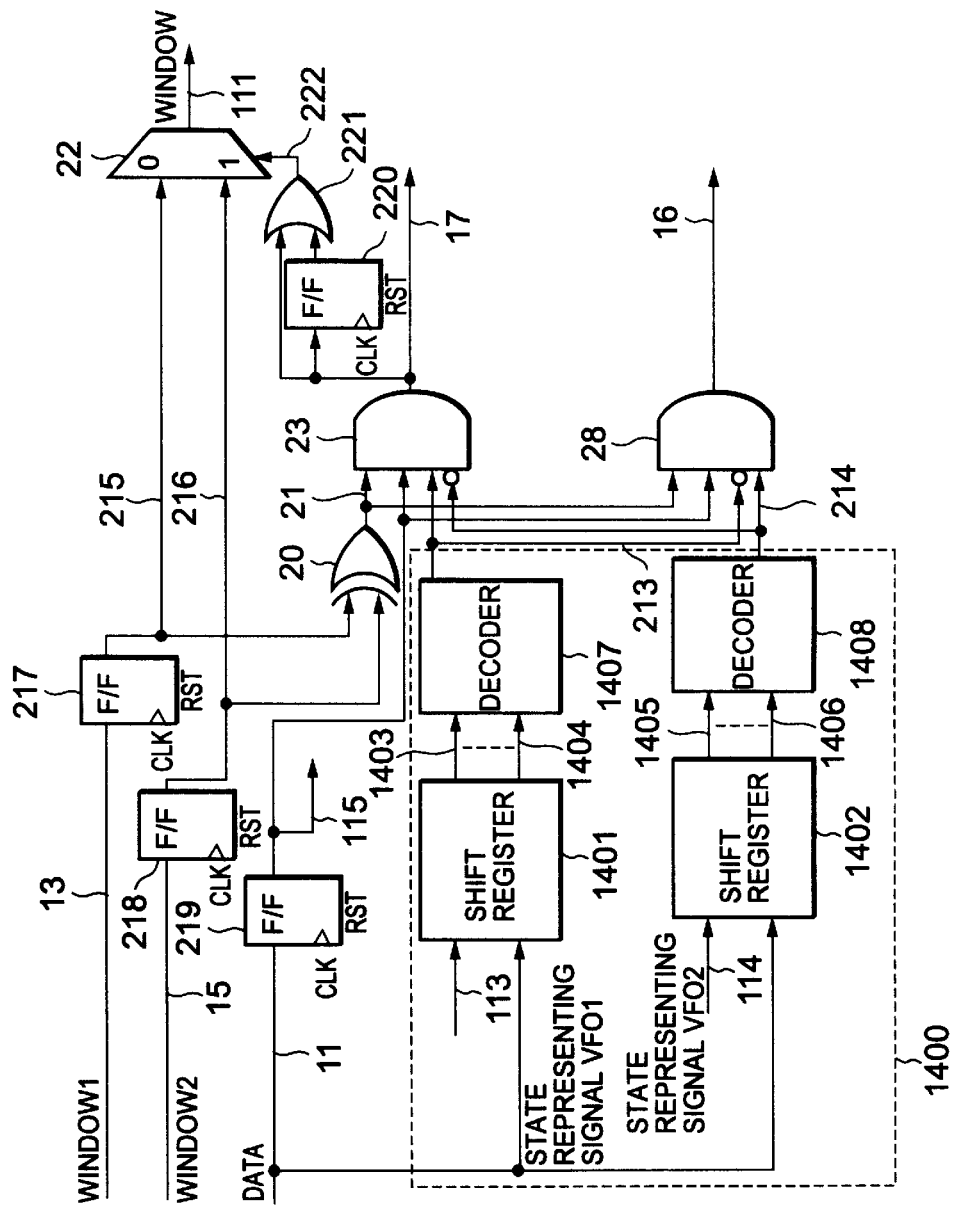
FIG. 15 is a block diagram showing the configuration of an adjusting circuit of a fourth embodiment.

FIGS. 15 and 16 show the configuration of a fourth embodiment.

In the first embodiment, each VFO carries out right and wrong judgment, based on two rounds of signal value STA (3:0) representing the peak shift generation state of VFO. However, in this fourth embodiment, the right and wrong judgment is carried out also based on more than two rounds of history of STA.

Thus, a judgment standard can be added that "It is abnormal that a right peak-shifted clock (data) bit is generated after there are more than two consecutive non-peak shift data (clock) bits".

FIG. 15 shows the configuration example of the fourth embodiment. Portions different from that of FIG. 7 are shown, being surrounded by dotted line. In the configuration of FIG. 7, when the serial data 11 is occurred, it is constituted so that two rounds of values of the signals 113 and 114 representing the peak shift generation state are storaged. However, the configuration of FIG. 15, more than two rounds of the values are storaged and then provided to decoders.

An example of logic of decoders 1407 and 1408 is shown in FIG. 16. In this example, three rounds of value of STA (5:0) are decoded.

In the configuration of FIG. 1 where only two rounds of the value are storaged, when no peak shift is generated, there is only one combination representing a contradiction. In the decoder of FIG. 3, it can be judged that after two same kind of consecutive non-peak shift bits are occurred, the same kind of a non-peak shift bit will be occurred once more, or only right peak-shifted bit will be occurred.

Accordingly, the adjusting circuit of this embodiment is characterized in comprising:

a first data storaging circuit which is provided for each of the plurality of VFO circuits and maintains a signal representing a peak shift state of a first input data which is input just before a second input data;

a second data storaging circuit which is provided for each of the plurality of VFO circuits and further maintains a signal representing a peak shift state of an input data just before the data being storaged in the firsts data storaging circuit;

a detecting circuit which is provided for each of the VFO circuits to detect whether a peak shift of the second input data complies with a predetermined logic, based on both a data being storaged in the first and second data storaging circuit and a signal representing a peak shift state of the second input data, and to output the correcting instruction signal to correct the counter value of the corresponding VFO circuit when it is detected not to comply with the predetermined logic; and a window pulse selecting circuit which selects one of the plurality of VFOs based on the detection result of the detecting circuit, and outputs, as an output signal, a WINDOW pulse of the selected VFO circuit.

The digital VFO device according to the present invention has such constructions in result of enabling MFM decoding to obtain both advantages of two VFOs having different characteristics.

Figure 5:
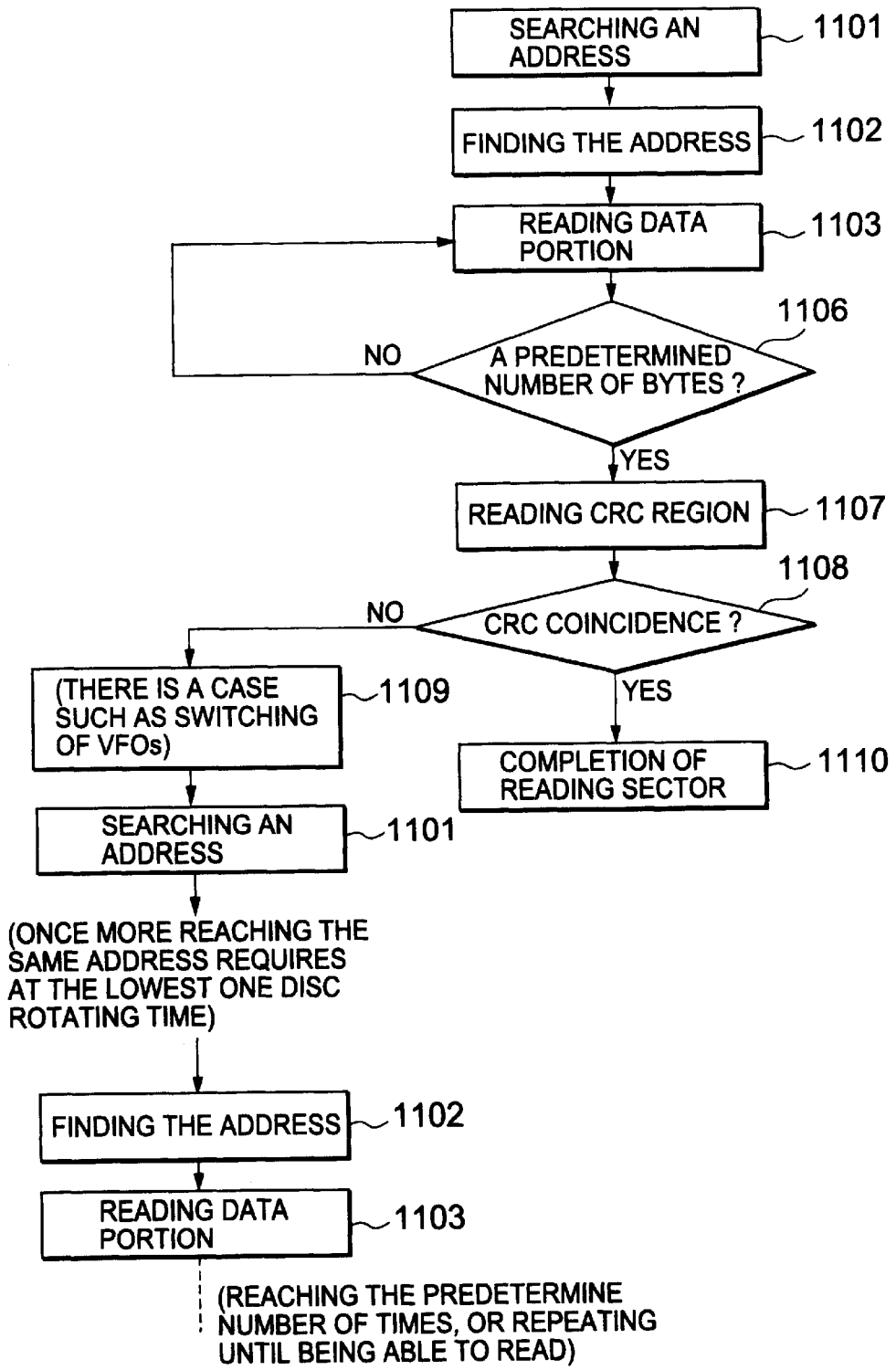
FIG. 5 is a flow chart for explaining the operation of the prior art.

FIG. 5 shows the procedure flow in the prior art configuration. In the prior art configuration shown in FIG. 5, the controller compares a value calculated by itself with a value read from CRC during the format process and can therefore initially notify if there is a decoding error. However, in the configuration according to the present invention, when an error is occurred in some VFO, a VFO performing a right correction process is selected, and WINDOW pulse generated by the right VFO is transmitted to the floppy controller. Therefore, the configuration according to the present invention greatly shortens time required for retry, compared to the prior art configuration where sector rereading is carried out by judgment of CRC region.

In more detail, once more reaching the error sector requires at the lowest one rotating time of disc, and therefore when using an usual 360 rpm disc drive, a required time for retry is given as "167[msec]×(the number of times of retry)".

In the configuration of the present invention, provided that one of VFOs has an ability of reading the sector in question, the sector can be read without retry, thereby eliminating necessity of time for retry.

Further, the adjusting circuit according to the present invention carries out error judgment using the peak shift generation rule. A spring of data having a peak shift was disclosed in the prior art documents such as Japanese Patent Laid-Open No. H5-303706. For instance, in case of employing two VFOs A and B having different characteristics which are alternatively used by switching operation, if any sector has characteristics a and b which VFOs A and B cannot deal with, respectively, the sector in question cannot be read with any of the VFOs, consequently falling into an unreadable sector.

In the present invention, when one of VFOs is in wrong operation, the state value of a right VFO is substituted for the wrong VFO. Thus, the part a of the sector is read with the VFO B, while the state value of the VFO B is substituted for the wrong VFO A to be returned to the right state.

Therefore, when the data b is appeared at next time, the rightly returned VFO A reads it, in result of enabling reading the sector which the prior art system cannot read even using the way of switching VFOs for retry.

What is claimed is:

1. A digital VFO device outputting, as output signal, a window signal in a predetermined phase relation to an input data having a peak shift, the digital VFO device comprising:

a plurality of VFO circuits receiving said input data having said peak shift and outputting a signal representing a peak shift state of said input data;

a synchronous counter provided for each of said plurality of VFO circuits and having a correcting characteristic different from each other; and an adjusting circuit selecting one of said plurality of VFO circuits based on said signal representing said peak shift state of said input data, and outputting a correcting instruction signal to substitute a counter value of said synchronous counter of said selected VFO circuit for said synchronous counter of the other VFO circuit so as to correct said synchronous counter of the other VFO circuit, wherein said adjusting circuit comprises:

a data storaging circuit provided for each of said plurality of VFO circuits and storaging a signal representing a peak shift state of a first input data being input just before a second input data;

a detecting circuit provided for each of said VFO circuits to detect whether a peak shift of said second input data complies with a predetermined logic, based on both a data being storaged in said data storaging circuit and a signal representing a peak shift state of said second input data, and to output said correcting instruction signal to correct said counter value of said corresponding VFO circuit when it is detected not to comply with the predetermined logic; and a window pulse selecting circuit selecting one of said plurality of VFOs based on the detection result of said detecting circuit, and outputting, as an output signal, a WINDOW pulse of said selected VFO circuit.

2. A digital VFO device according to claim 1, wherein one of said plurality of VFO circuits has priority, and when said detecting circuit does not output the detection result, a WINDOW pulse output from said VFO circuit having priority is outputted as the output signal.

3. A digital VFO device according to claim 1, wherein the signal representing said state of said peak shift of said input data includes at least a bit representing a right-shifted state of a clock signal, a bit representing a left-shifted state of a clock signal, a bit representing a right-shifted state of a data signal, and a bit representing a left-shifted state of a data signal.

4. A digital VFO device according to claim 1, wherein the signal representing said state of said peak shift of said input data includes a first clock bit being peak-shifted right, a first data bit being peak-shifted right, a second clock bit being peak-shifted left, and a second data bit being peak-shifted left, and when all bits of the signal representing said state of said peak shift are "0", it is judged that no right peak-shifted clock bit is appeared next to a data bit having no peak shift.

5. A digital VFO device according to claim 1, wherein the signal representing said state of said peak shift of said input data includes a first clock bit being peak-shifted right, a first data bit being peak-shifted right, a second clock bit which is peak-shifted left, and a second data bit being peak-shifted left, and when all bits of the signal representing said state of said peak shift are "0", it is judged that no right peak-shifted data bit is appeared next to a clock bit having no peak shift.

6. A digital VFO device according to claim 1, wherein right and wrong judgment is made for each of said VFO circuits based on two rounds of value of the signal representing said peak shift state, said right and wrong judgment is further made based on more than two rounds of value history of the signal representing said peak shift state, and after more than two consecutive data bit having no peak shift are occurred, it is judged that no right peak-shifted clock bit is occurred.

7. A digital VFO device according to claim 1, wherein right and wrong judgment is made for each of said VFO circuits based on two rounds of value of the signal representing said peak shift state, said right and wrong judgment is further made based on more than two rounds of value history of the signal representing said peak shift state, and after more than two consecutive clock bit having no peak shift are occurred, it is judged that no right peak-shifted clock bit is occurred.

8. A digital VFO device according to claim 1, wherein the output of said input data from the device is delayed by one system clock of the device, and also the output of said WINDOW pulse is delayed by one system clock of the device.

9. A digital VFO device outputting, as output signal, a window signal in a predetermined phase relation to an input data having a peak shift, the digital VFO device comprising:

a plurality of VFO circuits receiving said input data having said peak shift and outputting a signal representing a peak shift state of said input data;

a synchronous counter provided for each of said plurality of VFO circuits and having a correcting characteristic different from each other; and an adjusting circuit selecting one of said plurality of VFO circuits based on said signal representing said peak shift state of said input data, and outputting a correcting instruction signal to substitute a counter value of said synchronous counter of said selected VFO circuit for said synchronous counter of the other VFO circuit so as to correct said synchronous counter of the other VFO circuit, wherein said adjusting circuit comprises:

a first data storaging circuit provided for each of said plurality of VFO circuits and storaging a signal representing a peak shift state of a first input data being input just before a second input data;

a second data storaging circuit provided for each of said plurality of VFO circuits and further storaging a signal representing a peak shift state of an input data just before the data being storaged in said first data storaging circuit;

a detecting circuit provided for each of said VFO circuits to detect whether a peak shift of said second input data complying with a predetermined logic, based on both a data being storaged in said first and second data storaging circuit and a signal representing a peak shift state of said second input data, and to output said correcting instruction signal to correct said counter value of said corresponding VFO circuit when it is detected not to comply with the predetermined logic; and a window pulse selecting circuit selecting one of said plurality of VFOs based on the detection result of said detecting circuit, and outputting, as an output signal, a WINDOW pulse of said selected VFO circuit.

10. A digital VFO device according to claim 9, wherein one of said plurality of VFO circuits has priority, and when said detecting circuit does not output the detection result, a WINDOW pulse output from said VFO circuit having priority is outputted as the output signal.

11. A digital VFO device according to claim 9, wherein the signal representing said state of said peak shift of said input data includes at least a bit representing a right-shifted state of a clock signal, a bit representing a left-shifted state of a clock signal, a bit representing a right-shifted state of a data signal, and a bit representing a left-shifted state of a data signal.

12. A digital VFO device according to claim 9, wherein the signal representing said state of said peak shift of said input data includes a first clock bit being peak-shifted right, a first data bit being peak-shifted right, a second clock bit being peak-shifted left, and a second data bit being peak-shifted left, and when all bits of the signal representing said state of said peak shift are "0", it is judged that no right peak-shifted clock bit is appeared next to a data bit having no peak shift.

13. A digital VFO device according to claim 9, wherein the signal representing said state of said peak shift of said input data includes a first clock bit being peak-shifted right, a first data bit being peak-shifted right, a second clock bit which is peak-shifted left, and a second data bit being peak-shifted left, and when all bits of the signal representing said state of said peak shift are "0", it is judged that no right peak-shifted data bit is appeared next to a clock bit having no peak shift.

14. A digital VFO device according to claim 9, wherein right and wrong judgment is made for each of said VFO circuits based on two rounds of value of the signal representing said peak shift state, said right and wrong judgment is further made based on more than two rounds of value history of the signal representing said peak shift state, and after more than two consecutive data bit having no peak shift are occurred, it is judged that no right peak-shifted clock bit is occurred.

15. A digital VFO device according to claim 9, wherein right and wrong judgment is made for each of said VFO circuits based on two rounds of value of the signal representing said peak shift state, said right and wrong judgment is further made based on more than two rounds of value history of the signal representing said peak shift state, and after more than two consecutive clock bit having no peak shift are occurred, it is judged that no right peak-shifted clock bit is occurred.

16. A digital VFO device according to claim 9, wherein the output of said input data from the device is delayed by one system clock of the device, and also the output of said WINDOW pulse is delayed by one system clock of the device.

* * * * *